United States Patent [19]

Kunert

[11] Patent Number: 5,062,248

[45] Date of Patent: Nov. 5, 1991

[54] GLASS PANE INTENDED DIRECT BONDING, ESPECIALLY AUTOMOBILE GLASS PANE

[75] Inventor: Heinz Kunert, Cologne, Fed. Rep. of Germany

[73] Assignee: Saint-Gobain Vitrage, Courbevoie, France

[21] Appl. No.: 326,441

[22] Filed: Mar. 22, 1989

Related U.S. Application Data

[63] Continuation of Ser. No. 84,863, Aug. 13, 1987, abandoned.

[30] Foreign Application Priority Data

Aug. 13, 1986 [DE] Fed. Rep. of Germany ....... 3627536

[51] Int. Cl.$^5$ ............................. E06B 3/56; B60J 1/00
[52] U.S. Cl. ....................................... 52/208; 52/394; 296/84.1; 296/201
[58] Field of Search .......................... 52/208, 397, 400; 296/93, 84 A, 84 R, 201; 49/485, 489

[56] References Cited

U.S. PATENT DOCUMENTS

| | | | |
|---|---|---|---|
| 3,061,895 | 11/1962 | Kleinhans | 52/400 |
| 3,474,586 | 10/1969 | Hoverman, Jr. | 52/400 |
| 3,779,794 | 12/1973 | De Santis | 156/329 |
| 3,968,612 | 7/1976 | Endo et al. | 52/208 |
| 4,436,337 | 3/1984 | Bowes et al. | 52/208 |
| 4,571,278 | 2/1986 | Kunert | 52/400 |
| 4,683,694 | 8/1987 | Ziegler | 296/93 |

FOREIGN PATENT DOCUMENTS

| | | | |
|---|---|---|---|
| 3501490 | 7/1986 | Fed. Rep. of Germany | 296/84 A |
| 166517 | 8/1985 | Japan | 296/93 |

Primary Examiner—Michael Safavi
Attorney, Agent, or Firm—Oblon, Spivak, McClelland, Maier & Neustadt

[57] ABSTRACT

An automobile glass pane, intended for glueing to the fixing web of the window frame of an automobile body, is furnished along its edge with a profile strand of a hardened adhesive compound. This profile strand forms a no longer plastically deformable intermediate body between the glass pane and the adhesive strand. The profile strand is substantially of U-section and possesses anchorage projections. These anchorage projections produce a form-fitting and force-transmitting connection between the adhesive strand and the profile strand. They can additionally serve for the clamping fixing of different lugs, clips or profile strips.

13 Claims, 4 Drawing Sheets

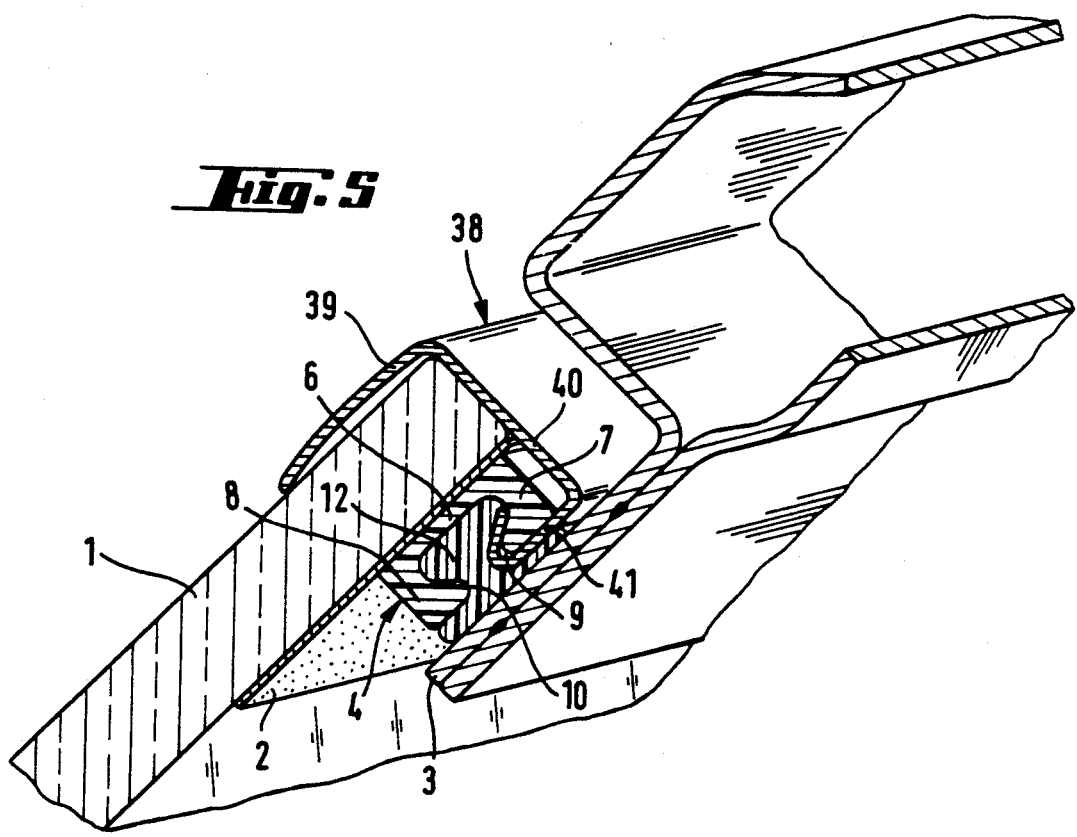
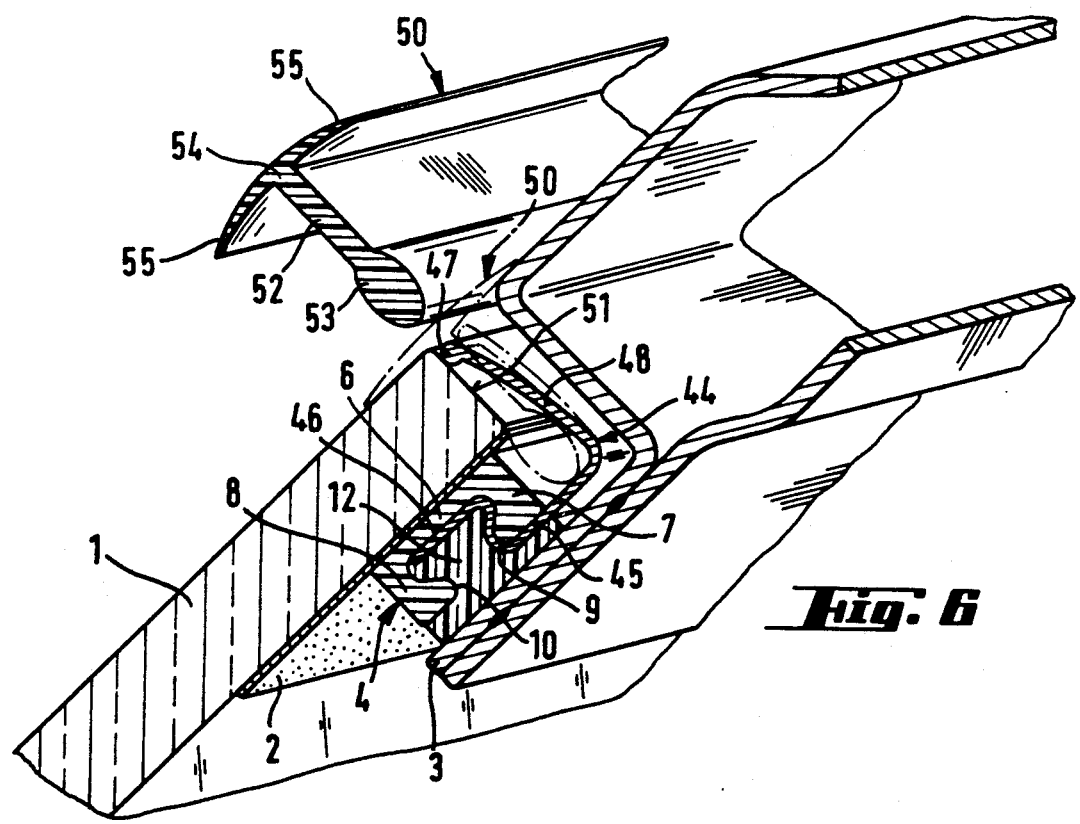

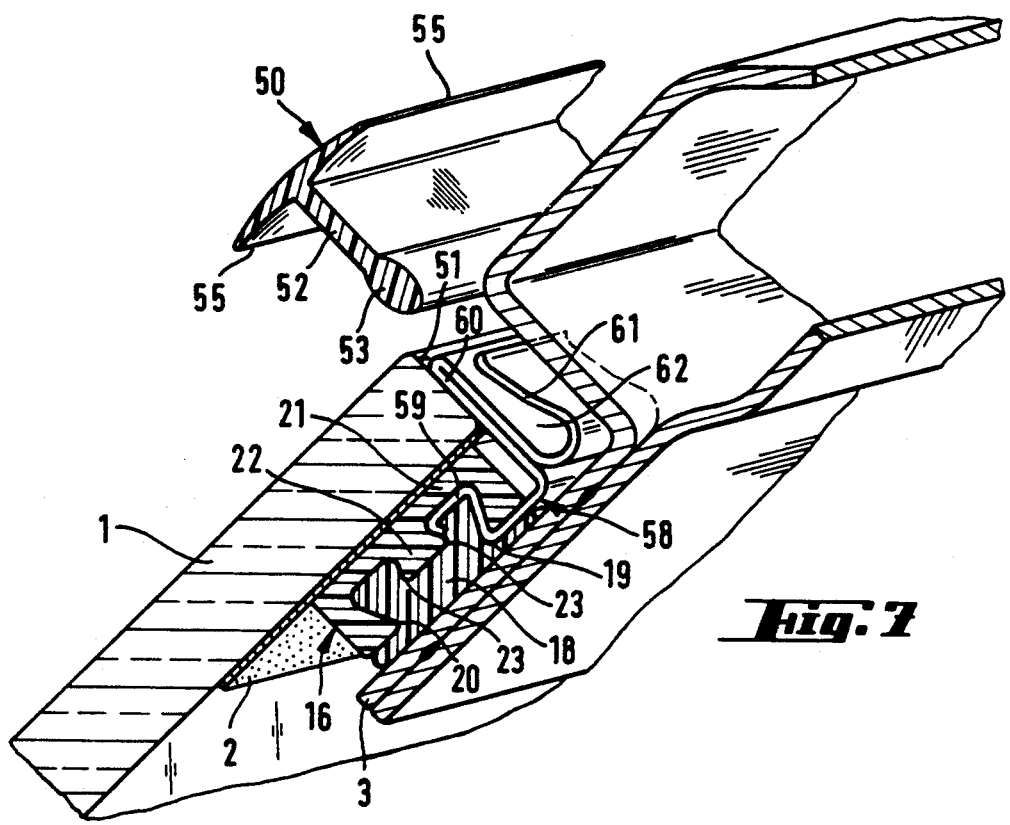
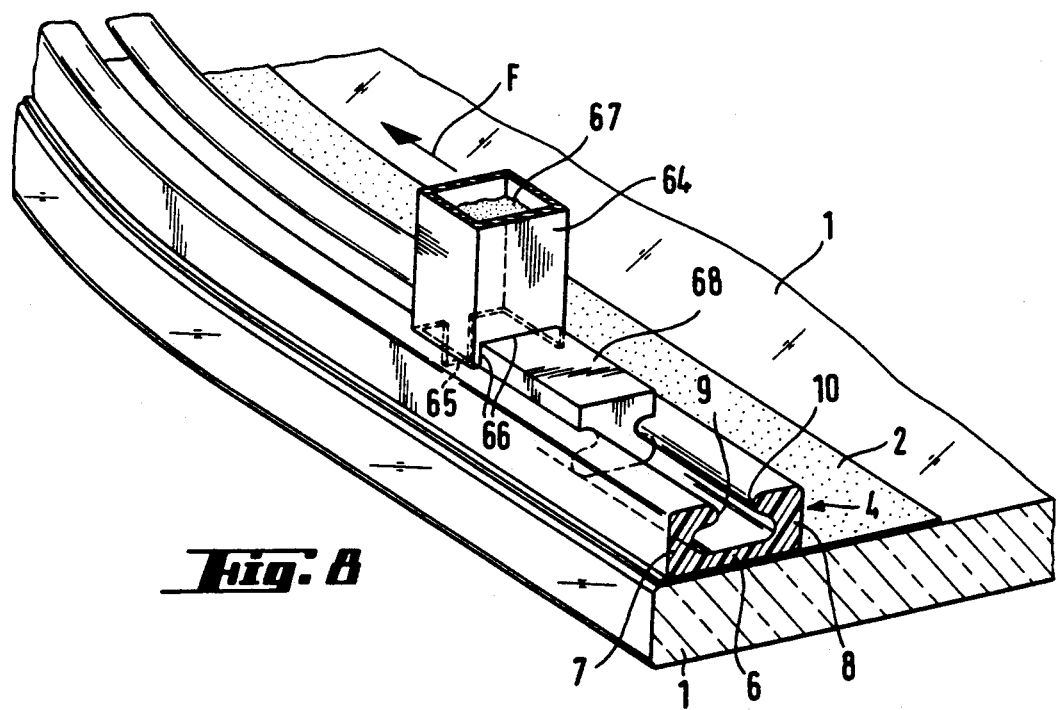

GLASS PANE INTENDED DIRECT BONDING, ESPECIALLY AUTOMOBILE GLASS PANE

This application is a division of application Ser. No. 084,863, filed on Aug. 13, 1987, now abandoned.

BACKGROUND OF THE INVENTION

1. Field of the Invention

This invention relates to a glass pane having a profile strand of a plastic material, disposed in the edge region and having a U-shaped cross-section, especially glass pane intended for direct bonding with the fixing web of a window opening, wherein at the time of application of the adhesive strand which makes the connection with the fixing web, the profile strand of plastic material disposed in the edge region of the glass pane constitutes a no longer plastically deformable intermediate body between the glass pane and the adhesive strand.

2. Background of the Related Art

From DE-OS 34 09 960, it is known to provide an automobile glass pane intended for the direct glazing by glueing to the fixing flange of the window frame by a profile strand of plastic material forming an intermediate body between the glass pane and the fixing flange. In this known construction, the profile strand consists of a plastic material compatible with the adhesive compound, especially one having the same or a similar composition to the adhesive compound. Preferably, this profile strand is extruded, in a process step preceding the true glueing, by means of a suitable extruder nozzle onto the glass surface prepared in a suitable manner. The profile strand is preferably of U-shaped cross-section, the two lateral flanges of the profile strand constituting boundary ribs for the adhesive strand which spreads out sideways during insertion of the glass pane.

In this known glazing method, which may also be termed two-step bonding, the connection of the second adhesive strand with the first, hardened profile strand disposed on the glass pane is made exclusively by adhesion.

SUMMARY OF THE INVENTION

The object of the present invention is to develop this known glass pane equipped with a profile strand so that the profile strand additionally can undertake other functions. In particular, the quality of the connection between the profile strand and the adhesive strand is to be capable of being influenced. Furthermore, the possibility of fixing additional holding or fixing elements is to be created by the profile strand itself.

The invention consists in that the profile strand, formed U-shaped in cross-section and glued to the glass pane, is furnished with anchorage profiles forming back-cut zones.

By the form of the profile strand according to this invention, a range of advantageous effects and additional possibilities of use can be achieved. Thus, on the one hand the result is achieved that, independently of adhesion forces, a form-fitting, mechanical anchorage between the profile strand and the adhesive strand takes place, which if necessary can alone ensure the necessary connection. Thus the stability of the connection in certain circumstances is independent of the adhesive effect of the adhesive to the profile strand. It is, indeed, possible to intentionally lower the adhesive effect or indeed suppress it completely, for example by the incorporating of a parting agent or by a choice of the materials, without the stability of the connection being thereby cancelled. In this manner, on the one hand the advantages of the adhesive method in the installation of automobile glass panes can be utilized, and on the other hand the disadvantage associated with the adhesive method in the dismantling of the glass pane, wherein the adhesive strand must be cut through by means of special tools, can be avoided. The dismantling of the glass pane can, indeed, in this case be carried out by simple pushing out of the glass pane, wherein the lateral flanges of the profile strand bend outwards apart from each other and the adhesive strand separates from the profile strand. By appropriate construction of the geometry of the profile strand, the strength of the connection which in the extreme case may be a pure clamped connection, can be varied within wide limits.

Furthermore, by the construction of the profile strand according to this invention, it is possible by a clamping effect, that is to say by force-transmitting and form-fitting connection, to connect additional lugs, clips, profile strips, decorative strips or the like with the profile strand constructed according to this invention. In this way, additional possibilities, useful in the installation of the glass pane into the window frame of an automobile body, can be opened up in order to simplify the installation process.

In the installation of a glass pane constructed according to this invention, the procedure advantageously is that the adhesive strand is pressed at high pressure by means of an extruder nozzle into the open channel of the profile strand, so that the adhesive compound fills the entire volume of the channel, and furthermore the quantity of adhesive necessary for bonding projects above the profile strand.

In an especially advantageous manner, in the installation of the automobile glass panes of this invention, adhesive compounds are used which expand by a specific amount when hardening. For example, agents which produce a small amount of gas and thereby slight expansion, or which create an increase in volume by some other method, may be added to the adhesive compound. In this manner, an especially good formfitting and force-transmitting connection between the adhesive cord and the profile strand can be achieved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a bonding of an automobile glass pane having a decorative profile frame connected to the profile strand by clamping action, carried out according to invention;

FIG. 6 is a bonding of an automobile glass pane having a clamping profile connected by clamping action to the profile strand for the seating of an additional decorative profile, carried out according to this invention;

FIG. 7 is a bonding of an automobile glass pane having individual clips connected by a clamping action with the profile strand for seating an additional decorative out according to this invention, and FIG. 8 is a partial view of an automobile glass pane according to this invention during the introduction of the adhesive strand.

DETAILED DESCRIPTION OF THE PREFERRED EMBODIMENTS

Figure 1:
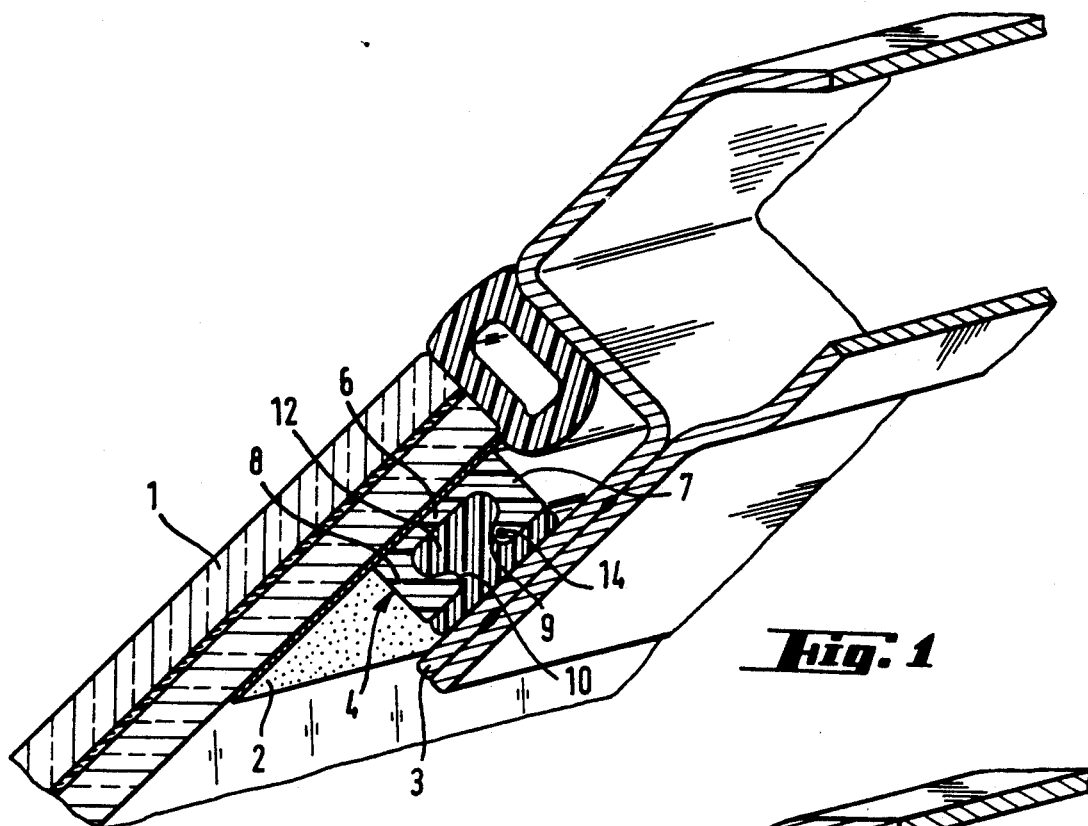
FIG. 1 is a first embodiment of a bonding of an automobile glass pane executed according to this invention.

For the glass panes according to this invention, basically any glass panes may be used, including both glass panes as used in the building industry and also glass panes intended for glazing of automobiles. In particular, the panes may be a windscreen, a rear window, a side window or a roof glass pane, and the glass pane may have any form of construction. Thus the glass pane 1 in FIG. 1 is a multi-layer composite safety glass pane, whereas the glass pane 1 illustrated in the other Figures is a single-pane safety glass pane.

Along the edge of the glass pane 1, a frame-like coating 2, a few centimetres wide, is disposed on the surface towards the fixing web 3 of the window frame. This frame-like coating 2 preferably consists of a ceramic baked-on lacquer which will not transmit light. On this frame-like coating 2, the profile strip 4 or 16, respectively, is disposed and is firmly and permanently bonded to the frame-like coating 2.

The profile strand 4, 16 may be a premolded profile strip, which in the hardened state is glued by suitable adhesive to the glass pane 1 or frame-like coating 2. In a particularly advantageous manner, however, the profile strand 4, 16 is extruded from a suitable extrudable adhesive compound, for example from a moisture-hardening, single-component polyurethane or from a two-component reaction adhesive on the basis of polyurethane, by means of an extruder nozzle profiled in a suitable way and having the desired cross-section, directly onto the glass pane or frame-like coating 2 respectively, optionally after a pretreatment of the glass pane or frame-like coating 2 by means of a suitable cleaner and/or primer. Suitable compositions for adhesive systems which may be considered for the production of the profile strand and the preparation of the frame-like coating 2 are described, for example, in U.S. Pat. No. 3 779 794.

The profile strand 4 illustrated in FIG. 1 has a substantially U-shaped cross-section with a central web 6 and the two lateral flanges 7 and 8. The lateral flanges 7, 8 are furnished, in their end zones, with projections 9, 10 oriented inwards, that is to say towards each other. Beneath these projections 9, 10, the channel-shaped cavity of the profile strand 4 widens out, and the projections 9, 10 form in this manner the desired back-cut zones, which have an increased width as compared to the spacing between the projections 9, 10 and which serve for mechanically anchoring the adhesive strand 12. The adhesive strand 12 fills the entire cavity of the profile strand 4, so that a form-fitting connection is obtained between the profile strand 4 and the adhesive strand 12.

If no special measures are taken, and if the plastic compound forming the profile strand 4 is compatible with the plastic compound forming the adhesive strand 12, the adhesive strand 12 bonds with the profile strand 4 at the contact surface by adhesion effect, in addition to mechanical interlocking, so that an especially firm and reliable connection between the profile strand 4 and the adhesive strand 12 is achieved.

It may, however, be desired not to make the connection between the profile strand 4 and the adhesive strand 12 too strong, so that in case of need, for example if the glass pane 1 is damaged and must be changed for a new glass pane, the profile strand 4 can be separated from the adhesive strand 12. In this case, the adhesion between the profile strand 4 and adhesive strand 12 must be less than the adhesion between the profile strand 4 and the glass pane 1 or coating 2, on the one hand, and less than the adhesion between the adhesive strand 12 and the fixing web 3 on the other hand. To reduce the adhesion between the profile strand 4 and the adhesive strand 12, a parting agent may be applied onto the surface of the profile strand 4 before the adhesive strand 12 is introduced into the profile strand 4. By choice of suitable parting agent, the adhesion effect between the profile strand 4 and the adhesive strand 12 can be reduced to zero, in which case the connection therebetween is obtained solely by mechanical interlocking. The strength of this mechanical connection can, for its part, be modified by the form of the profiling within wide limits.

As a dismantling aid for the glass plane 1, a tearing thread 14 may be incorporated into the profile strand 4, preferably in the outer projection 9 of the lateral flange 7. The embedding of the tearing thread 14 into the profile strand 4 may be carried out by the method described in DE-OS 34 09 903. By means of this tearing thread 14, separation of the profile strand 4 from the adhesive strand 12 can be obtained in an especially simple manner.

Figure 2:
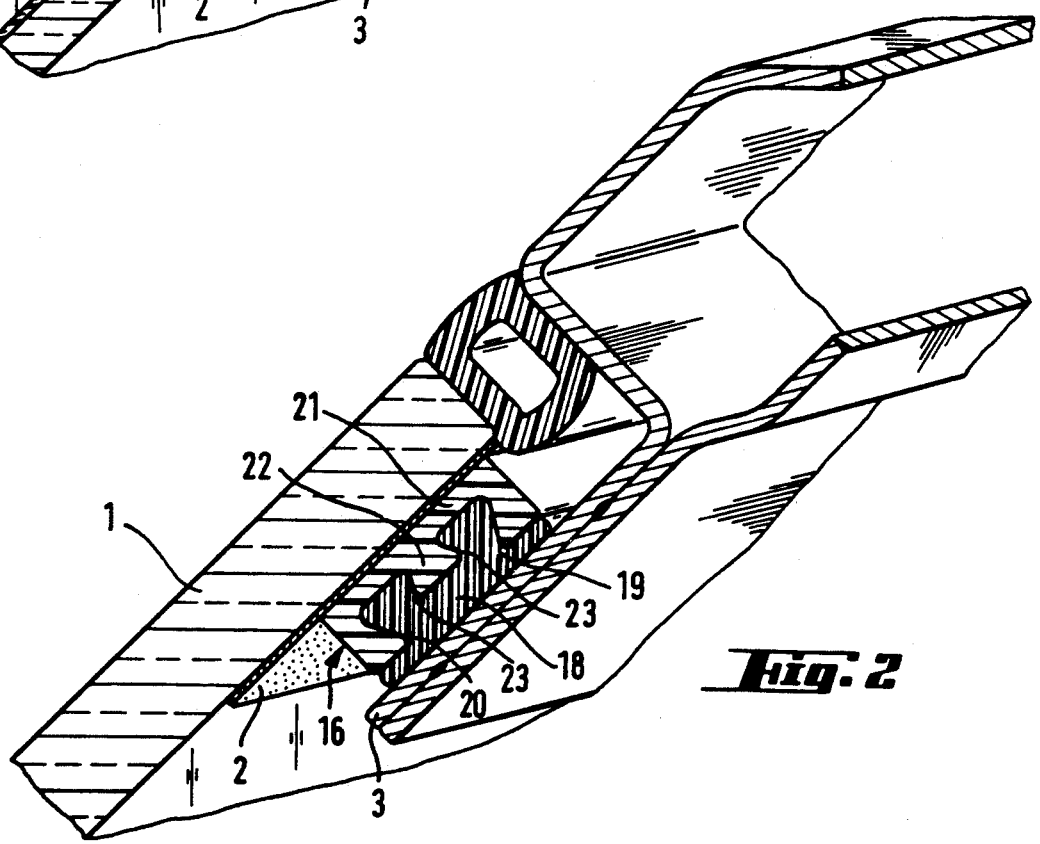
FIG. 2 is a second embodiment of a bonding of an automobile glass pane executed according to this invention.

In the embodiment illustrated in FIG. 2, the profile strand 16 has a cross-sectional shape which permits a still stronger interlocking between ths profile strand 16 and adhesive strand 18. In addition to the two inner projections 19, 20 on the lateral flanges of the profile strand, a further web 22, penetrating into the cavity of the profile strand is provided on the central web 21, which web 22 diverges conically towards the end to form projections 23. These projections 23 form two further back-cut recesses, into which the adhesive compound of the adhesive strand 18 penetrates, which increases the strength of the form-fitting connection.

In FIGS. 3 to 7, various embodiments are illustrated in which the profile strand 4 constructed according to this invention not only serves for mechanical anchorage of the adhesive strand but at the same time is utilized for the clamping connection of different lugs, clips or profile strips.

Figure 3:
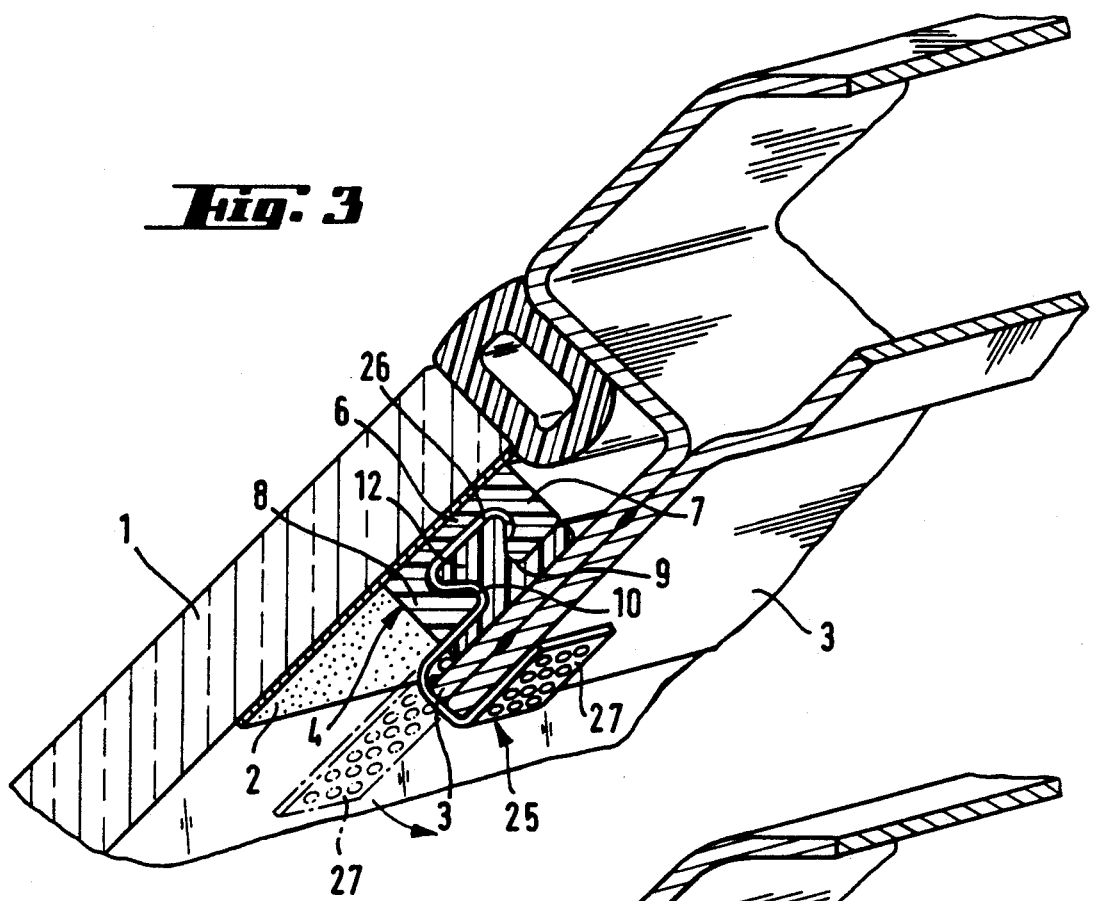
FIG. 3 is a bonding of an automobile glass pane having an additional fixing lug carried out according to this invention.

FIG. 3 shows a first embodiment for the clamping connection of a fixing lug 25, which serves for fixing the glass pane 1, after insertion into the window frame, for the period during which the adhesive strand 12 has not yet hardened in order to prevent the glass pane 1 from shifting under its own weight. The fixing lugs 25 have a rigid clamping portion 26 and a plastically deformable tongue-shaped portion 27 which before insertion of the glass pane 1 into the window frame extends substantially parallel to the glass pane 1 (chain lines in FIG. 3). After insertion of the glass pane 1 into the window frame and accurate positioning, the tongue-shaped portions 27 of the fixing lugs 25, the required number of which are fitted along the periphery of the pane, are bent around the fixing web 3 of the window frame, causing the glass pane 1 to be fixed in the desired manner. The clamping portion 26 of the fixing lug is so adapted to the internal profile of the profile strand 4 that it is securely held in the desired position by the anchorage projections 9, 10, which can be achieved by appropriate shaping. The hardened profile strand 4 possesses a sufficient elastic deformability so that the fixing portion 26 can be pushed into the channel-shaped cavity of the profile strand with elastic deflection of the lateral flanges 7, 8.

Figure 4:
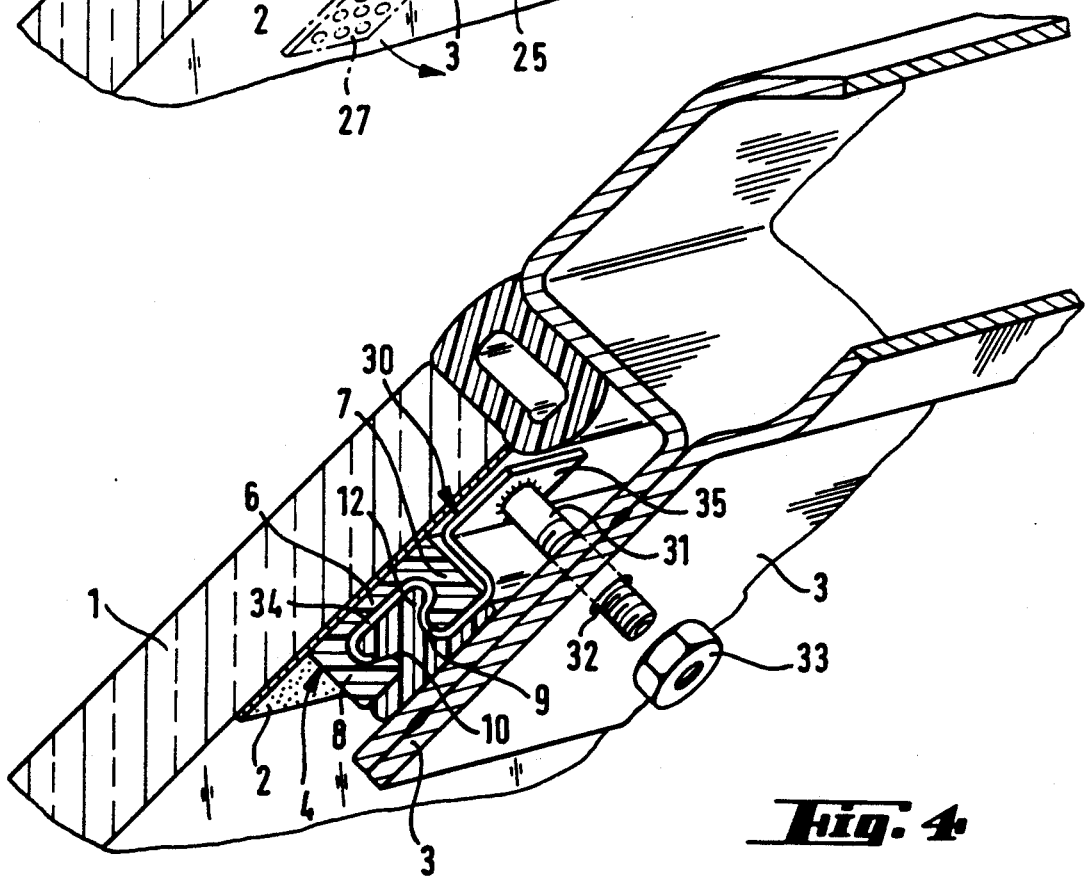
FIG. 4 a bonding of an automobile glass pane having a fixing bolt connected to the profile strand by clamping action, carried out according to this invention.

Another type of additional mechanical connection of the glass pane 1 to the fixing web 3 of the window frame is illustrated in FIG. 4. In this case, a fixing clip 30 is form-fittingly and forcetransmittingly connected with the profile strand 4. A threaded bolt 31 is fixed to this clip, which bolt passes through a hole 32 in the fixing web 3 and cooperates with a nut 33. The clamping portion 34 is, here again, adapted to the internal contour of the cross-section of the profile strand 4 and ensures a firm clamped connection of the fixing clip 30 to the profile strand 4. The clamping portion 34 of the fixing clip 30 is adjoined by a crank portion 35, to which the threaded bolt 31 is connected, for example by welding. Whereas, in the case illustrated, the profile strand 4 is set back inwards from the edge of the glass pane 1 by a distance of about 1 to 2 cm and the crank portion 35 of the fixing clip 30 with the threaded bolt 31 is situated outside the profile strand 4, the arrangement can, of course, also be such that the profile strand 4 runs directly along the edge of the glass pane and the crank portion 35 points towards the inside of the pane 1.

FIG. 5 illustrates an embodiment in which a frame-like decorative profile or strip 38 is disposed on the edge of the glass pane 1, this profile being connected by a clamped connection with the profile strand 4. The decorative profile 38 has a substantially U-shaped cross-section with a lateral flange 39 engaging over the outer face of the glass pane 1, this flange forming the actual visible decorative frame, with a central web 40 bearing against the peripheral surface of the glass pane 1, and with the fixing flane 41 engaging over the profile strand 4 and bent around at the end to a hook-shape, its inwardly bent portion engaging behind the projection 9 of the profile strand 4. The decorative profile frame 38 is secured to the edge of the glass pane 1 before the adhesive compound 12 is introduced into the cavity of the profile strand.

In the embodiment illustrated in FIG. 6, a generally L-section profile strip 44 is secured all around the glass pane 1 by clamping action with the profile strand 4. The profile strip 44 has, as viewed in cross-section, a flange 45 having a crank at its end, of which the crank end portion 46 makes the clamping connection with the profile strand 4, and has a flange 48 bearing resiliently at its end portion 47 against the peripheral surface of the glass pane 1. This profile strip 44 is also secured by clamping action on the edge of the glass pane 1 before the adhesive oompound 12 is introduced into the cavity of the profile strand 4 and the glass pane is inserted into the window opening. When, after insertion of the glass pane 1, the adhesive strand 12 has hardened, a separate profile strip 50, T-shaped in cross-section, can be fixed in the fixing groove formed by the peripheral surface 51 of the glass pane 1 and the flange 48 of the profile strip 44, in order to cover the gap between the peripheral surface of the glass pane 1 and the window frame. For this purpose, the fixing web 52 with the thickened foot portion 53 is pushed into the fixing groove until the upper transverse web 54 bears with its two sealing lips 55 against the surface of the glass on the one hand and the window frame on the other hand.

In the embodiment shown in FIG. 7, instead of a continuous profile strip for the fixing of the covering profile 50, a row of fixing clips 58 are secured to the profile strand 16 by clamping action at intervals along the periphery of the glass pane 1. The fixing clips 58 in turn have a clamping portion 59, by which the formfitting and force-transmitting connection of the fixing clips 58 with the profile strand 16 is made. The fixing clips 58 possess a central web 60, bearing against the peripheral surface of the glass pane, and an end portion 61, folded over through 180°, which constitutes an insertion groove 62 for the web 52 and foot portion 53 of the profile strip.

The introduction of the adhesive compound into the cavity of the profile strip 4, 16 is advantageously carried out under pressure, using an extrusion nozzle 64 as shown in FIG. 8. The extrusion nozzle 64 consists of a downwardly open pipe, which is placed in a perpendicular orientation on the profile strand 4 and is guided along the profile strand in the direction of the arrow F. The extrusion nozzle 64 is furnished, on its front face at the bottom, with a guide projection 65, which penetrates into the open gap of the profile strand 4 and is guided by the latter. On the rear face, the extrusion nozzle 64 is furnished with a calibrated cut-out 66, through which the adhesive compound 67 emerges and forms a calibrated adhesive strand 68. When the adhesive compound has been introduced in this manner into the profile strand 4 along the entire periphery of the glass pane 1, the thus pretreated glass pane is inserted into the window frame of the automobile body.

Obviously, numerous modifications and variations of the present invention are possible in light of the above teachings, it is therefore to be understood that within the scope of the appended claims, the invention may be practiced otherwise than as specifically described herein.

What is claimed as new and desired to be secured by Letters Patent of the United States is:

1. A glass pane assembly bonded to a fixing web of a window, comprising:
   a glass pane;
   a hardened plastic profile strand adhered to an edge portion of said pane, said profile strand having a U-shaped cross-section with flanges defining a channel shaped cavity, said flanges having anchorage projections oriented towards one another to define cut back zone with increased width as compared to a spacing between said projections; and
   a hardened adhesive strand filling said channel and adhering to the fixing web of the window opening, whereby said hardened plastic profile strand and said adhesive strand are united by a form-fitting mechanical connection resulting from the width of the cut back zones being greater than the spacing between said projections.

2. The assembly of claim 1 wherein said anchorage projections are at ends of said flanges.

3. The assembly of claim 2 wherein said profile strand includes a central web connecting said flanges and a rib extending into said cavity from said central web, said rib including anchorage projections oriented towards said anchorage projections of said flanges.

4. The assembly of claim 2 wherein said profile strand is adhered to said pane by an adhesive.

5. The assembly of claim 2 wherein said profile strand is formed of an extruded adhesive compound applied to said pane when in an unhardened state.

6. The assembly of claim 2 including an adhesion reducing agent applied to surfaces of said profile strand to which said adhesive strand is adhered.

7. The assembly of claim 2 including at least one plastically deformable fixing lug each having a rigid clamping portion fitted in said cavity and forming a force transmitting and form fitting connection with said profile strand, and a deformable tongue portion.

8. The assembly of claim 2 including at least one fixing clip each having a clamping portion fitted in said cavity and forming a force transmitting and form fitting connection with said profile strand, a crank portion and a fixing bolt connection with the fixing web of the window opening.

9. The assembly of claim 2 including a frame-shaped decorative strip having an end portion fitted in said cavity and forming a force transmitting and form fitting connection with said profile strand and a portion surrounding the edge of said pane.

10. The assembly of claim 2 including at least one L-section profile strip having an end portion fitted in said cavity and forming a force transmitting and form fitting connection with said profile strand and a flange extending parallel to the edge of said pane to define an insertion groove, and a push in decorative profile insertable in said insertion groove.

11. The assembly of claim 2 including at least one fixing clip having an end portion fitted in said cavity and forming a force transmitting and form fitting connection with said profile strand and a portion extending parallel to the edge of said pane and having a folded over end portion to define an insertion groove, and a push in decorative profile insertable in said insertion groove.

12. The assembly of claim 2 wherein said profile strand is made from a moisture hardening, single compound polyurethane composition.

13. The assembly of claim 2 wherein said profile strand is made from a two component reaction mixture which reacts to produce a polyurethane.

* * * * *